(12) United States Patent
Nomura et al.

(10) Patent No.: US 8,233,561 B2
(45) Date of Patent: Jul. 31, 2012

(54) IMAGE FORMING APPARATUS AND DATA COMMUNICATION METHOD

(75) Inventors: Takeshi Nomura, Toyohashi (JP); Koji Ohara, Toyokawa (JP); Masao Kondo, Toyokawa (JP); Shinichi Yabuki, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1233 days.

(21) Appl. No.: 12/015,169

(22) Filed: Jan. 16, 2008

(65) Prior Publication Data

US 2008/0218790 A1 Sep. 11, 2008

(30) Foreign Application Priority Data

Mar. 7, 2007 (JP) ................................ 2007-057379

(51) Int. Cl.
*H04L 27/00* (2006.01)
(52) U.S. Cl. ........ 375/295; 375/130; 375/146; 375/147; 375/259; 375/316; 327/100; 327/160; 327/172; 455/91; 455/130; 358/1.15
(58) Field of Classification Search .................. 375/130, 375/146, 147, 259, 295, 316; 455/91, 130; 327/100, 160, 172; 358/1.15
See application file for complete search history.

(56) References Cited

U.S. PATENT DOCUMENTS

2008/0080598 A1* 4/2008 Mo et al. ....................... 375/219

FOREIGN PATENT DOCUMENTS

JP 07-170383 7/1995
JP 2001-309174 A 11/2001

OTHER PUBLICATIONS

Notice of Allowance issued in corresponding Japanese Application No. 2007-057379 dated Feb. 17, 2009.

\* cited by examiner

*Primary Examiner* — Leon Flores
(74) *Attorney, Agent, or Firm* — Buchanan Ingersoll & Rooney (57) ABSTRACT

Data comprising a pulse signal is divided into predetermined data segments. The number of pulse-signal fluctuations in the data segment is counted. A transmitter transmits the unchanged data to a receiving portion in a case where the number of pulse-signal fluctuations does not exceed a predetermined number. On the other hand, in a case where the number of pulse-signal fluctuations exceeds the predetermined number, the pulse signal is converted so as to be unchanged at the fluctuation of the pulse signal but to be fluctuated when the pulse signal does not fluctuate. Then, the transmitter transmits the converted pulse signal to the receiving portion wherein only the converted pulse signal is converted to the original pulse signal.

11 Claims, 9 Drawing Sheets

IMAGE FORMING APPARATUS AND DATA COMMUNICATION METHOD

RELATED APPLICATION

This application is based on application No. 57379/2007 filed in Japan, the contents of which are hereby incorporated by reference.

BACKGROUND OF THE INVENTION

1. Field of the Invention

The present invention relates to an image forming apparatus such as copiers and printers, as well as to a data communication method. Particularly in an image forming apparatus including a transmitter for sequentially transmitting data, such as image data, which comprises a variety of pulse signals, and a receiving portion for receiving the data comprising the pulse signal transmitted from the transmitter, a feature of the invention resides in a data communication method which is effective to prevent the occurrence of high-level irradiation noise when the transmitter transmits the data, such as the image data, which contains a high-frequency pulse signal having a large number of On/Off shifts.

2. Description of the Related Art

The image forming apparatus such as the copiers and printers conventionally perform a variety of operations such as image formation, as follows. The transmitter transmits the data, such as the image data, comprising a variety of pulse signals. The receiving portion receives the data comprising the pulse signal and transmitted from the transmitter. The operations such as the image formation are performed based on the data comprising the pulse signal and received by the receiving portion.

Unfortunately, the image data or the like often contains the high-frequency pulse signal having a large number of On/Off shifts. In a case where the transmitter transmits such a high-frequency pulse sign a to the receiving portion via a relatively long transmission member such as a harness, the high-level radiation noise occurs so that peripheral devices are adversely affected.

As disclosed in Japanese Unexamined Patent Publication No. 2001-309174, the following image processing apparatus and method have been proposed in the art.

The apparatus and method comprises: means for generating a flag signal which is invertible between On position and Off position in junction with each multivalued image data piece;

converting means for converting the multivalued image data to density data based on the multivalued image data and the flag signal; and means for converting the resultant density data to serial video signals.

According to the image forming apparatus and the image processing method, out of the signals comprising plural bits representing respectively generated density data pieces, on-bits are collectively raised in a timewise forward or rearward direction according to the flags whereby the number of On/Off shifts is reduced for suppressing the radiation noises.

However, the following problem is encountered in the case where out of the signals comprising the plural bits representing the respectively generated density data pieces, the on-bits are collectively raised in the timewise forward or rearward direction according to the flags. Although the general density of the image may be controlled, it is impossible to achieve a proper density control based on an image binarization method such as dither method because On/Off positions are shifted from those of the original image data. In addition, the formed images suffer feathering at edges thereof. Hence, the apparatus and method fail to provide favorable images.

SUMMARY OF THE INVENTION

In an image forming apparatus including a transmitter for sequentially transmitting data, such as image data, comprising a variety of pulse signal; and a receiving portion for receiving the data comprising the pulse signals and transmitted from the transmitter, an object of the invention is to effectively prevent a high-level radiation noise in a case where the transmitter transmits to the receiving portion the data, such as the image data, which includes a high-frequency pulse signal having a large number of On/Off shifts.

An image forming apparatus according to the invention comprises:

a transmitter for transmitting data comprising a pulse signal;

a receiving portion for receiving the data comprising the pulse signal and transmitted from the transmitter;

a data segmenting portion for segmenting the data comprising the pulse signal into predetermined segments;

a fluctuations number counting portion for counting the number of pulse-signal fluctuations in the data segment segmented by the data segmenting portion;

a determining portion for determining whether the number of pulse-signal fluctuations counted by the fluctuations number counting portion exceeds a predetermined number or not;

a transmission data controller which causes the transmitter to transmit the unchanged data comprising the pulse signal if the determining portion determines that the number of pulse-signal fluctuations does not exceed the predetermined number, but which converts the pulse signal and causes the transmitter to transmit the resultant data if the determining portion determines that the number of pulse-signal fluctuations exceeds the predetermined number, the converted pulse signal which is unchanged at the fluctuation of the pulse signal but is fluctuated when the pulse signal does not fluctuate; and a converting portion for converting the converted pulse signal received by the receiving portion to the original pulse signal.

A data communication method according to the invention comprises the steps of:

segmenting data comprising a pulse signal into predetermined segments;

counting the number of pulse-signal fluctuations in the data segment;

determining whether the count of pulse-signal fluctuations exceeds a predetermined number or not;

transmitting the unchanged data comprising the pulse signal in a case where it is determined that the number of pulse-signal fluctuations does not exceed the predetermined number;

converting the pulse signal and transmitting the converted pulse signal in a case where it is determined that the number of pulse-signal fluctuations exceeds the predetermined number, the converted pulse signal which is unchanged at the fluctuation of the pulse signal but is fluctuated when the pulse signal does not fluctuate; and receiving the converted pulse signal transmitted to a receiving portion and converting the converted pulse signal to the original pulse signal.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Next, an image forming apparatus and data communication method according to an embodiment of the invention will be specifically described with reference to the accompanying drawings. It is to be noted that the image forming apparatus and data communication method according to the embodiment are not particularly limited to those illustrated by the following embodiments and modifications or changes may be made thereto as needed so long as such modifications or changes do not deviated from the scope of the invention.

Figure 1:
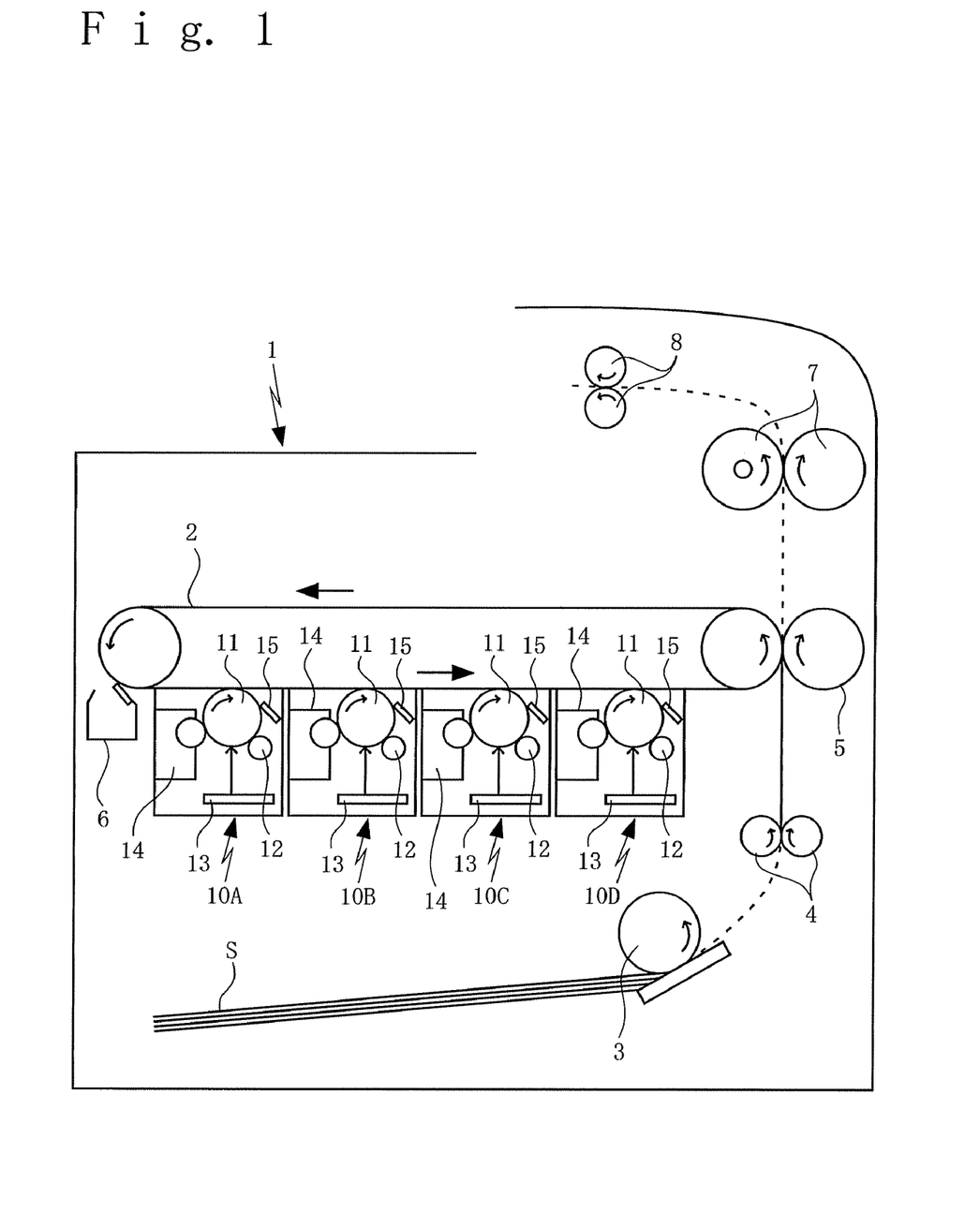
FIG. 1 is a schematic sectional view showing an internal structure of an image forming apparatus according to one embodiment of the invention.

In this image forming apparatus, as shown in FIG. 1, four imaging cartridges 10A to 10D as process cartridges for use in image forming apparatus are mounted in an apparatus body 1.

Each of the above imaging cartridges 10A to 10D includes: a photosensitive member 11; a charger 12 for electrically charging a surface of the photosensitive member 11; an exposure device 13 for irradiating light on the charged surface of the photosensitive member 11 according to image information thereby forming an electrostatic latent image on the surface of the photosensitive member 11; a developing device 14 for forming a toner image by supplying a toner to the electrostatic latent image formed on the surface of the photosensitive member 11; and a cleaner 15 for removing residual toner from the surface of the photosensitive member 11 after the toner image formed on the surface of the photosensitive member 11 is transferred to an intermediate transfer belt 2.

The image forming apparatus of the embodiment forms a full color image as follows. The developing devices 14 of the imaging cartridges 10A to 10D contain therein toners of mutually different colors of black, yellow, magenta and cyan, respectively. The individual imaging cartridges 10A to 10D form the toner images of the respective colors on the respective photosensitive members 11 thereof.

Subsequently, the toner images of the respective colors formed on the surfaces of the photosensitive members 11 of the imaging cartridges 10A to 10D are sequentially transferred to the intermediate transfer belt 2, whereby a full-colored toner image is formed on the intermediate transfer belt 2.

On the other hand, a sheet feeding roller 3 feeds a recording medium S, which is introduced into space between the intermediate transfer belt 2 and a transfer roller 5 in a proper timing by means of timing rollers 4. Thus, the full-colored toner image formed on the intermediate transfer belt 2 is transferred to the recording medium S.

The recording medium S having the full-colored toner image so transferred thereto is led into space between a pair of fixing rollers 7 so that the full-colored toner image is fixed to the recording medium S. Subsequently, the recording medium S is discharged by means of discharge rollers 8.

The toner not transferred to the recording medium S and remaining on the transfer belt 2 is removed therefrom by means of a second cleaner 6.

Figure 2:
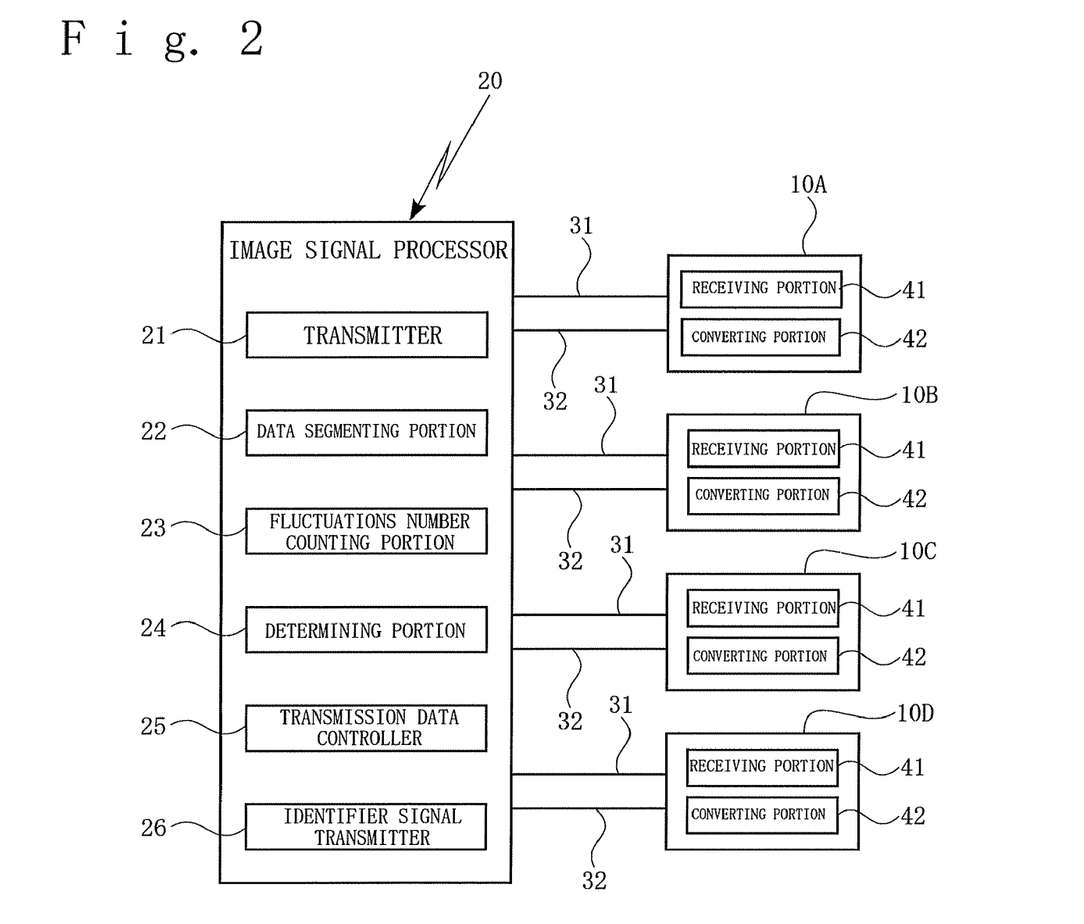
FIG. 2 is a block diagram of the image forming apparatus of the above embodiment showing an example where an image signal processor and each imaging cartridge are interconnected via two signal lines for intercommunications.

In this image forming apparatus, as shown in FIG. 2, an image signal processor 20 disposed in the apparatus body 1 is connected with each of the imaging cartridges 10A to 10D via first and second signal lines 31, 32.

Data communications are carried out between the image signal processor 20 and each of the imaging cartridges 10A to 10D via the respective pair of signal lines 31, 32, so that the exposure device 13 of each of the imaging cartridges 10A to 10D may be controlled.

The above image signal processor 20 includes:
a transmitter 21 for transmitting data comprising a pulse signal to each of the imaging cartridges 10A to 10D;
a data segmenting portion 22 for dividing the data comprising the pulse signal into predetermined segments;
a fluctuations number counting portion 23 for counting the number of pulse-signal fluctuations in the data segment segmented by the data segmenting portion 22;
a determining portion 24 for determining whether the number of pulse-signal fluctuations counted by the fluctuations number counting portion 23 exceeds a predetermined number or not;
a transmission data controller 25 which causes the transmitter 21 to transmit the unchanged data comprising the pulse signal if the determining portion 24 determines that the number of pulse-signal fluctuations does not exceed the predetermined number, but which converts the pulse signal and causes the transmitter 21 to transmit the resultant data if the determining portion 24 determines that the number of pulse-signal fluctuations exceeds the predetermined number, the converted pulse signal which is unchanged at the fluctuation of the above pulse signal but is fluctuated when the above pulse signal does not fluctuate; and
an identifier signal transmitter 26 which transmits an identifier signal to the individual imaging cartridges 10A to 10D on a per-data-segment basis, the identifier signal discriminating the signal transmitted from the transmitter 21 between the unconverted pulse signal and the converted pulse signal.

Each of the imaging cartridges 10A to 10D includes: a receiving portion 41 for receiving the data comprising the pulse signal and transmitted from the transmitter 21 via each first signal line 31 and the identifier signal transmitted from the identifier signal transmitter 26 via each second signal line 32; and a converting portion 42 for converting the above converted pulse signal to the original pulse signal.

In the image forming apparatus of this embodiment, the image data comprising various pulse signals is transmitted from the above transmitter 21 to the receiving portion 41 of each of the imaging cartridges 10A to 10D via the first signal line 41 as follows. The data segmenting portion 22 divides the image data comprising the pulse signal into predetermined segments. The number of pulse-signal fluctuations in the data segment is counted by the fluctuations number counting portion 23.

The determining portion 24 determines whether the count of pulse-signal fluctuations exceeds the predetermined number or not. If the number of pulse-signal fluctuations does not exceed the predetermined number, the transmission data controller 25 causes the transmitter 21 to transmit the unchanged image data comprising the above pulse signal. On the other hand, if it is determined that the number of pulse-signal fluctuations exceeds the predetermined number, the transmission data controller 25 converts the above pulse signal and causes the transmitter 21 to transmit the converted pulse signal, which is unchanged at the fluctuation of the pulse signal but is fluctuated when the pulse signal does not fluctuate. The transmission data controller 25 also causes the identifier signal transmitter 26 to transmit the identifier signal on a per-data-segment basis, the identifier signal discriminating the signal from the transmitter 21 between the unconverted pulse signal and the converted pulse signal.

This constitution reduces the number of fluctuations of the pulse signal transmitted from the transmitter 21 from the number of fluctuations of the pulse signal of the original image data, so that the radiation noises may be suppressed.

In the image forming apparatus of the embodiment, the pulse signal transmitted from the transmitter 21 and the identifier signal transmitted from the identifier signal transmitter 26 are received by the receiving portion 41 of each of the imaging cartridges 10A to 10D. Based on the identifier signal transmitted from the identifier signal transmitter 26, only the pulse signal converted by the transmission data controller 25 is converted to the original pulse signal by means of the above converting portion 42.

This permits the receiving portion 41 of each of the imaging cartridges 10A to 10D to correctly reproduce the image data comprising the original pulse signal, so that the exposure device 13 is controlled properly. Hence, a proper density control based on an image binarization method such as dither method may be provided. Further, favorable images free from feathering at edges may be formed.

Figure 3:
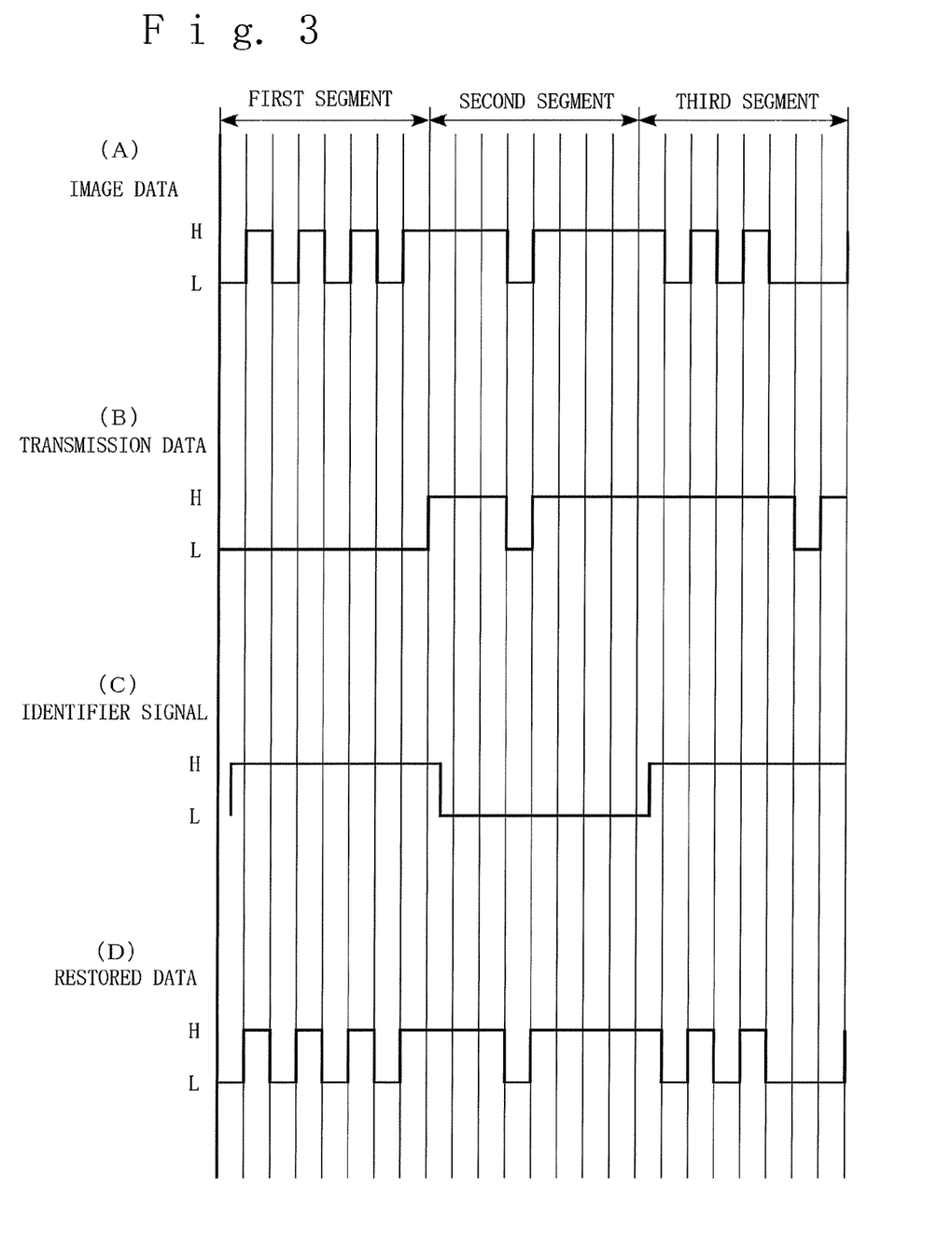
FIG. 3 is a graph illustrating a pulse signal of image data, a pulse signal of transmission data converted from the image data, an identifier signal, and a pulse signal of restored data obtained by converting the transmission data, the signals used in the image forming apparatus of the above embodiment.

Next, a specific description is made on a case where the image data comprising a pulse signal shown in FIG. 3A is divided into each segment of eight data pieces by means of the data segmenting portion 22, each data segment is subjected to the aforementioned data processing, and the resultant data segment is transmitted by the transmitter 21. In this embodiment, the determining portion 24 determines whether the number of fluctuations of the pulse signal in the data segment exceeds five or not.

In the image data shown in FIG. 3A, the pulse signal in the first segment fluctuates between High level (abbreviated as "H") and Low level (abbreviated as "L") in the order of L, H, L, H, L, H, L, H. That is, the pulse signal undergoes seven level fluctuations. The pulse signal in the second segment has the signal level fluctuated in the order of H, H, H, L, H, H, H, H, undergoing two level fluctuations. The pulse signal in the third segment has the signal level fluctuated in the order of H, L, H, L, H, L, L, L, undergoing five level fluctuations. The term "the number of fluctuations", as used herein, means the number of fluctuations between the two signal levels or the number of times the signal level fluctuates from H to L or L to H.

The transmission data controller 25 takes the following procedure to process the above image data before transmitting the processed data from the transmitter 21. As shown in FIG. 3B, the pulse signal in the first segment undergoes the seven level fluctuations, which exceeds five times. Therefore, the pulse signal is so converted as to be unchanged at the fluctuation of the pulse signal but to be fluctuated when the pulse signal does not fluctuate. That is, the converted pulse signal has the level fluctuated in the order of L, L, L, L, L, L, L, L. The pulse signal in the second segment undergoes the two level fluctuations, which is less than five times. Therefore, the pulse signal is not converted, keeping the levels in the order of H, H, H, L, H, H, H, H. The pulse signal in the third segment undergoes the five level fluctuations, which exceeds five times. Therefore, the pulse signal is converted the same way as that of the first segment. The converted pulse signal has the level fluctuated in the order of H, H, H, H, H, H, L, H.

Transmission data comprising the pulse signal thus processed is transmitted from the transmitter 21 to the receiving portion 41 of each of the imaging cartridges 10A to 10D via the respective first signal line 31.

As shown in FIG. 3C, the identifier signal transmitter 26 transmits an H-identifier signal, as the identifier signal, from a position somewhat delayed from a heading signal of the first segment. The H-identifier signal indicates that the first signal segment transmitted from the transmitter 21 comprises the converted pulse signal. The identifier signal transmitter 26 transmits an L-identifier signal from a position somewhat delayed from a heading signal of the second signal segment. The L-identifier signal indicates that the second signal segment comprises the unconverted pulse signal. The identifier signal transmitter 26 transmits an H-identifier signal from a position somewhat delayed from a heading signal of the third signal segment. The H-identifier signal indicates that the third signal segment comprises the converted pulse signal. The identifier signal is transmitted to the receiving portion 41 of each of the imaging cartridges 10A to 10D via the respective second signal line 32.

In each of the imaging cartridges 10A to 10D, on the other hand, the converting portion 42 obtains restored data, as shown in FIG. 3D, by converting only the converted pulse signal of the transmission data to the original pulse signal based on the transmission data transmitted from the transmitter 21 to the receiving portion 41 and the identifier signal transmitted from the identifier signal transmitter 26 to the receiving portion 41.

As shown in FIG. 3D, the first signal segment of the above transmission data has the H-identifier signal and hence, the converting portion 42 converts the converted pulse signal having the levels in the order of L, L, L, L, L, L, L, L to the original pulse signal having the levels in the order of L, H, L, H, L, H, L, H. The second signal segment has the L-identifier signal indicating that the pulse signal is unconverted. Hence, the converting portion 42 does not convert the received pulse signal which keeps the levels in the order of H, H, H, L, H, H, H, H. The third signal segment has the H-identifier signal.

Hence, the converting portion 42 converts the converted pulse signal having the levels in the order of H, H, H, H, H, H, L, H to the original pulse signal having the levels in the order of H, L, H, L, H, L, L, L.

As a result, the restored image data comprising the same pulse signal that composes the original image data is restored correctly in each of the imaging cartridges 10A to 10D.

Figure 4:
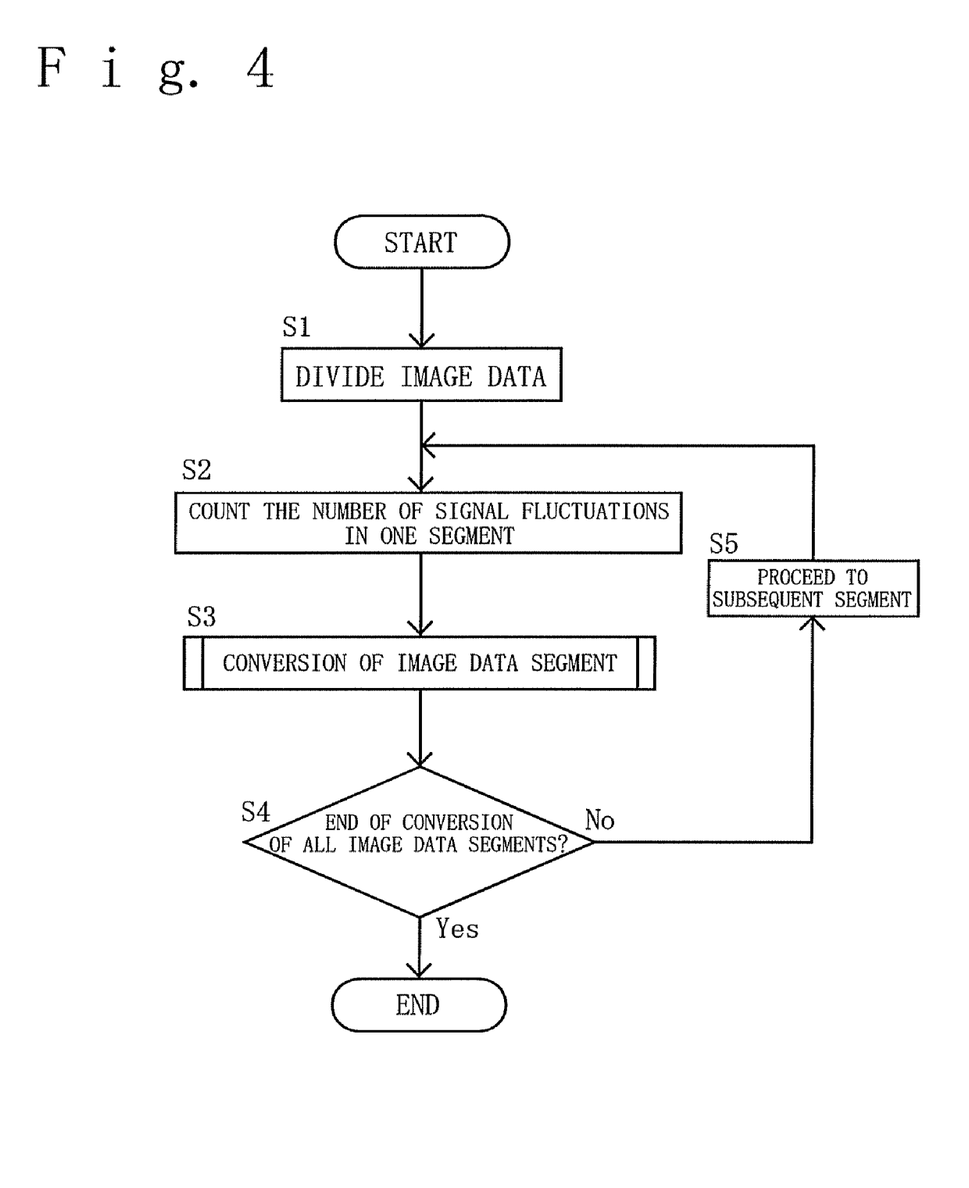
FIG. 4 is a flow chart showing the steps of an operation of converting the image data to the transmission data, the operation performed by the image forming apparatus of the above embodiment.

Next, an exemplary operation of converting the image data to the transmission data by segmenting the image data is described with reference to a flow chart of FIG. 4, the operation performed by the image forming apparatus according to the above embodiment.

First, in Step S1, the image data is divided into data segments each including a predetermined number of data pieces d, say eight data pieces in the above embodiment.

In the subsequent Step S2, the number of signal fluctuations n in one data segment is counted. The operation proceeds to Step S3 where the image data segment is converted to the transmission data. The conversion of the image data of one segment is carried out according to a subroutine shown in FIG. 5, which will be described herein later.

After the image data segment is converted, the operation proceeds to Step S4 to determine whether the conversion of all the image data segments is completed or not. If the conversion of all the image data segments is completed, the operation ends. On the other hand, if the conversion of all the image data segments is not completed, the operation proceeds to Step S5 where the conversion operation proceeds to the subsequent segment. Then, the operation returns to Step S2 to repeat the aforementioned operations till the image data of all the segments is converted. The operation ends when the conversion of all the image data segments is completed.

Figure 5:
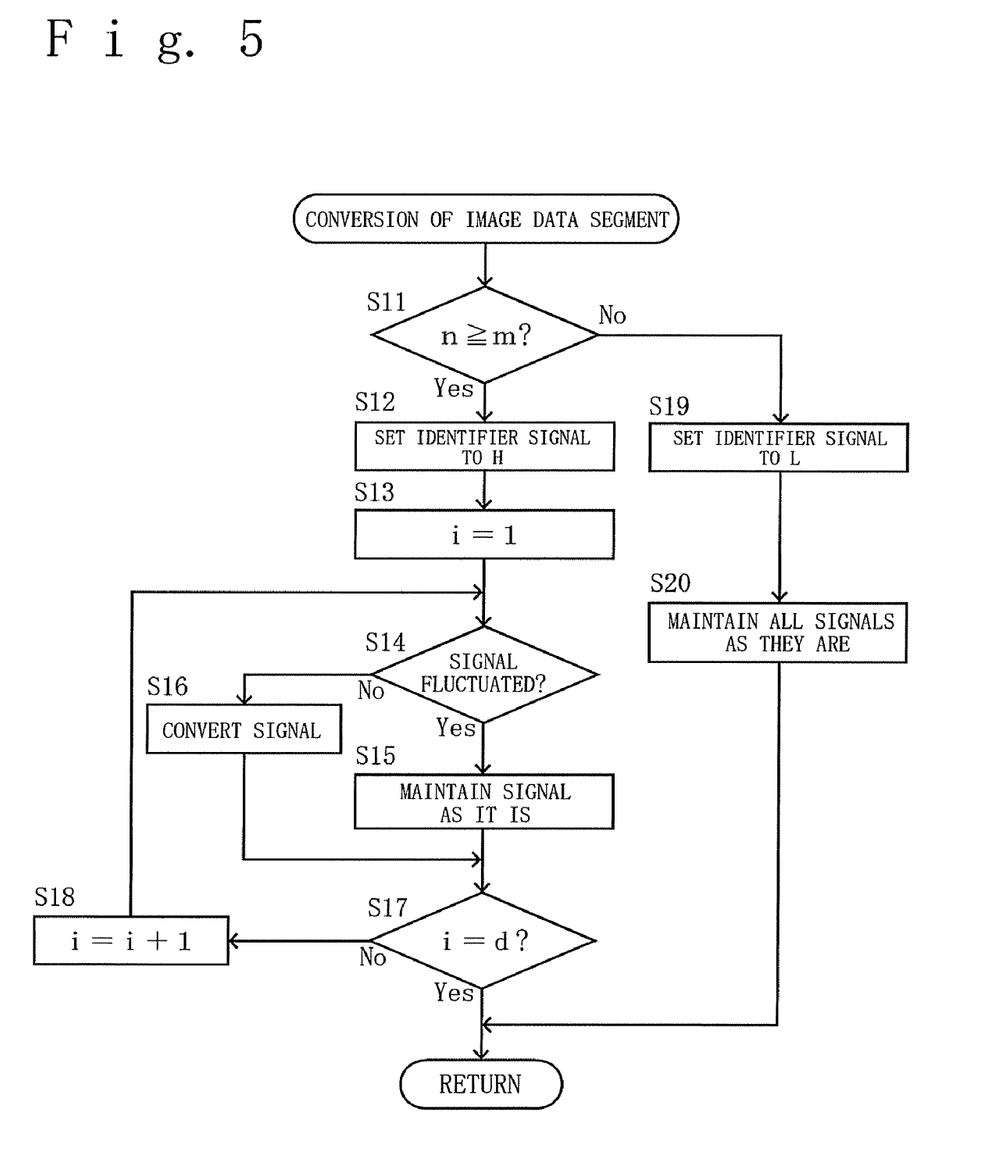
FIG. 5 is a flow chart showing the steps of a subroutine of converting an image data segment in the flow chart shown in FIG. 4.

Next, the operation of converting the image data of one segment in Step S3 is described with reference to a flow chart shown in FIG. 5.

First, in Step S11, determination is made as to whether or not the number of signal fluctuations in the segment, as counted in Step S2, exceeds a predetermined number m requiring the execution of the conversion process. According to the above embodiment, for example, whether or not the number of signal fluctuations exceeds five is determined.

If the number of signal fluctuations n exceeds the predetermined number m, the operation proceeds to Step S12 to set the H-identifier signal. Subsequently, the operation proceeds to Step S13 to set a data process number i to 1.

Next, the operation proceeds to step S14 to determine whether the signal is fluctuated or not. If the signal is fluctuated, the operation proceeds to Step S15 where the signal is not converted and maintained as it is. If the signal is not fluctuated, the operation proceeds to Step S16 where the signal is converted.

Next, the operation proceeds to S17 to determine whether or not the data process number i reaches the predetermined number of data pieces d. If the data process number I reaches the predetermined number of data pieces d, the conversion of the image data segment ends. Subsequently, the operation returns to the flow chart shown in FIG. 4. On the other hand, if the data process number i does not reach the predetermined number of data pieces d, the operation proceeds to Step S18 to increment the data process number i by 1. Then, the operation returns to Step S14 so as to repeat the above operations till the data process number i reaches the predetermined number of data pieces d. Thus, the conversion of the image data segment is completed. Subsequently, the operation returns to the flow chart shown in FIG. 4.

In a case where it is determined in above step S11 that the number of signal fluctuations n in the data segment, as counted in the above step S2, is less than the predetermined number m requiring the execution of the conversion process, the operation proceeds to Step S19 to set the above identifier signal to L. In the subsequent step S20, all the signals of the data segment are not converted and maintained as they are. Thus, the conversion of the image data segment is completed. The operation returns to the flow chart shown in FIG. 4.

Figure 6:
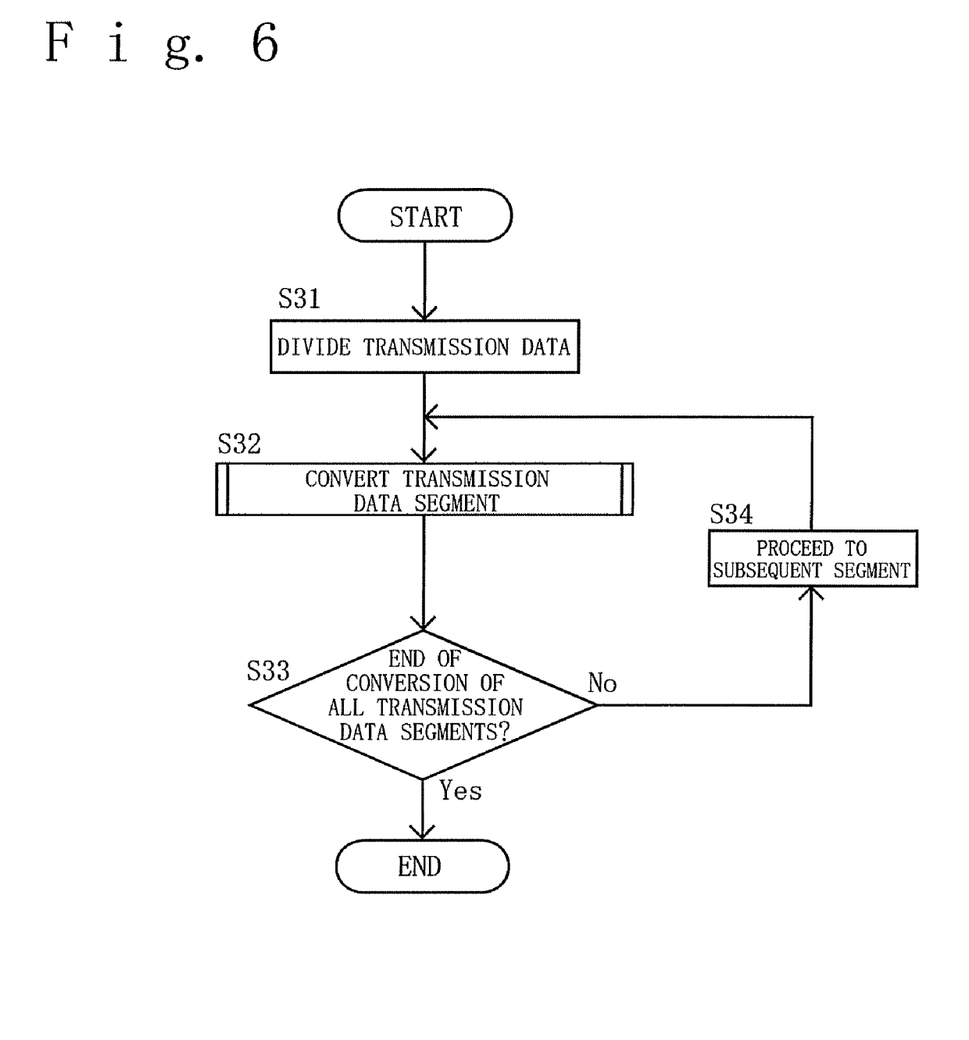
FIG. 6 is a flow chart showing the steps of an operation of converting the received transmission data to the restored data, the operation performed by the image forming apparatus of the above embodiment.

Referring to a flow chart shown in FIG. 6, description is made on an exemplary operation of restoring the above transmission data to the original data, the operation performed after the receiving portion receives the transmission data thus converted.

First, in Step S31, the received transmission data is divided into each set of the predetermined number of data pieces d. According to the above embodiment, for example, the transmission data is divided into each set of eight data pieces.

Figure 7:
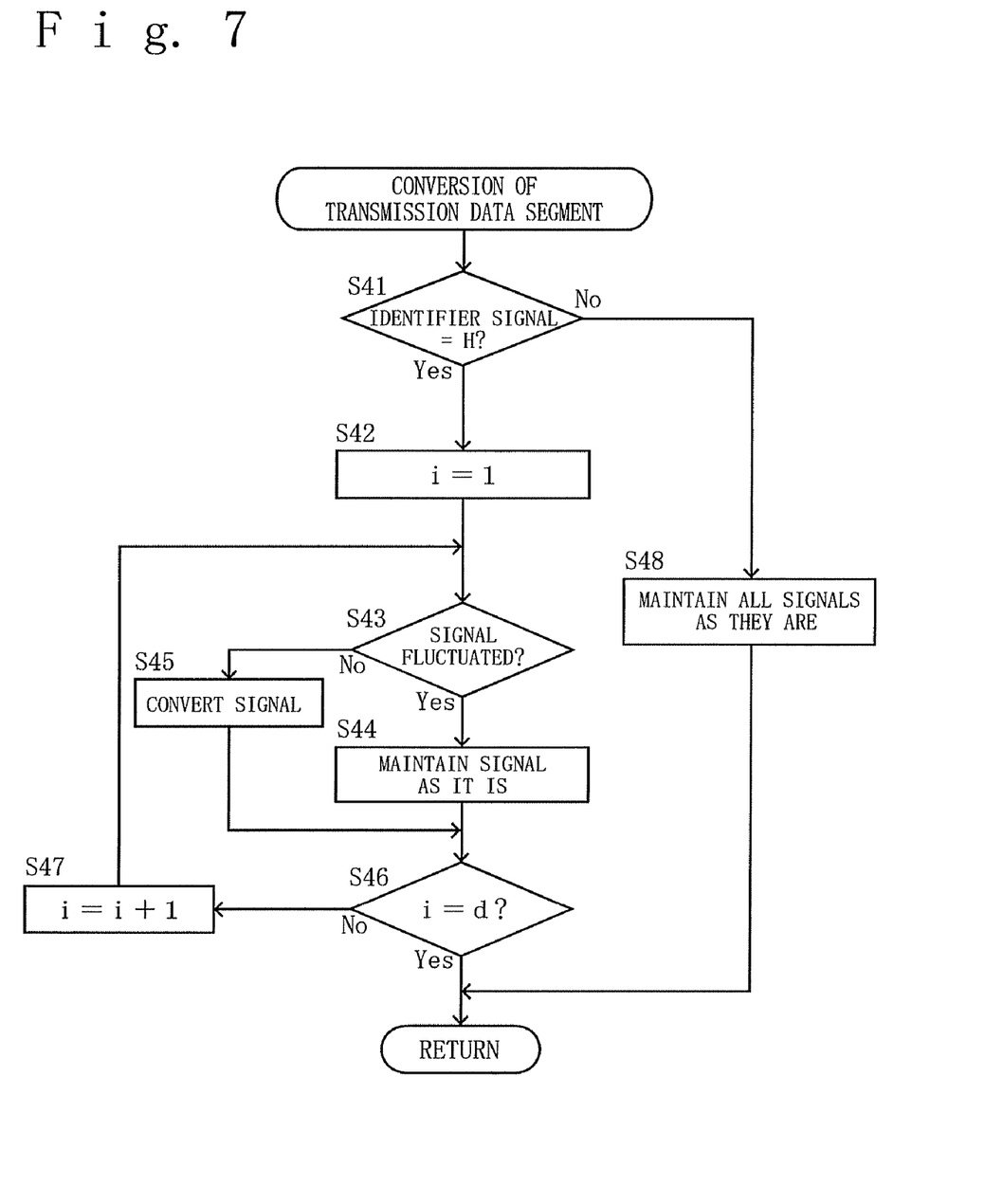
FIG. 7 is a flow chart showing the step of a subroutine of converting a transmission data segment in the flow chart shown in FIG. 6.

In the subsequent Step S32, each transmission data segment is subjected to a conversion process, which is carried out according to a subroutine shown in FIG. 7 to be specifically described herein later.

After the transmission data segment is converted, the operation proceeds to Step S33 to determine whether the conversion of all the transmission data segments is completed or not. The operation ends if the conversion of all the transmission data segments is completed. On the other hand, if the conversion of all the transmission data segments is not completed, the operation proceeds to Step S34 where the conversion proceeds to the subsequent segment. That is, the operation returns to the above Step S32 to repeat the aforementioned operations till the conversion of all the transmission data segments is completed. The operation ends when the conversion of all the transmission data segments is completed.

The operation of converting the transmission data segment in Step S32 is described with reference to a flow chart shown in FIG. 7.

First, in Step S41, determination is made as to whether the identifier signal indicates H or not.

In the case of the H-identifier signal, the operation proceeds to Step S42 to set the data process number i to 1.

Subsequently, the operation proceeds to Step S43 to determine whether the signal is fluctuated or not. If the signal is fluctuated, the operation proceeds to Step S44 where the signal is not converted and maintained as it is. On the other hand, if the signal is not fluctuated, the operation proceeds to Step S45 to convert the signal.

Subsequently, the operation proceeds to Step S46 to determine whether or not the data process number i reaches the above predetermined number of data pieces d. If the data process number reaches the predetermined number of data pieces d, the conversion of the transmission data segment is completed. The operation returns to the flow chart shown in FIG. 6. On the other hand, if the data process number i does not reach the predetermined number of data pieces d, the operation proceeds to Step S47 to increment the data process number I by 1. Then, the operation returns to the above Step S43 to increment the data process number i by 1. The operation returns to Step S43 so as to repeat the aforementioned operations till the data process number i reaches the predetermined number of data pieces d. Thus is completed the conversion of the transmission data segment. The operation returns to the flow chart shown in FIG. 6.

On the other hand, if it is determined in Step S41 that the identifier signal does not indicate H, thus indicating L, the operation proceeds to Step S48 where all the signals of the data segment are not converted and maintained as they are.

The conversion of the transmission data segment is completed and the operation returns to the flow chart shown in FIG. 6.

Figure 8:
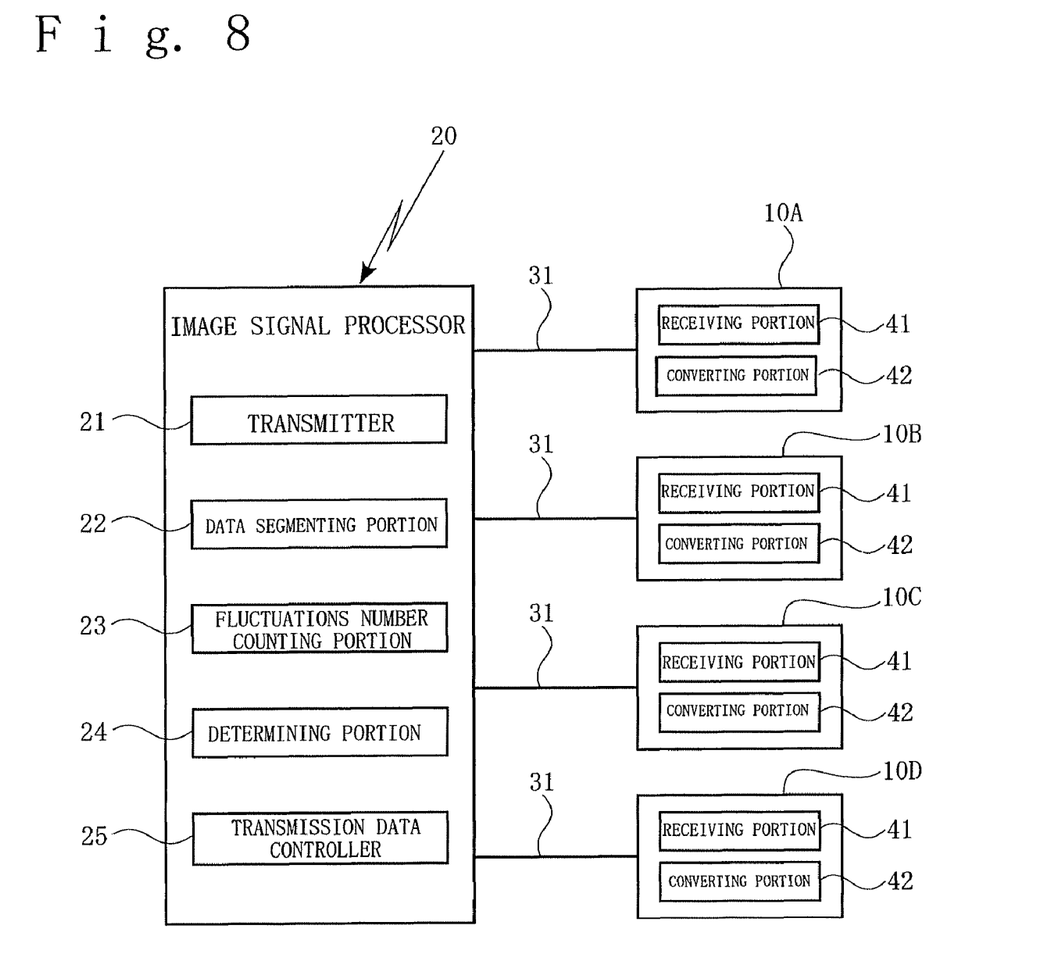
FIG. 8 is a block diagram showing an exemplary modification of the image forming apparatus of the above embodiment wherein an identifier signal transmitter and each of the second signal lines are omitted and the identifier signal is added to the transmission data transmitted by the transmitter.

In the image forming apparatus according to the embodiment, the identifier signal transmitter 26 for transmitting the identifier signal is provided in addition to the transmitter 21, such that the identifier signal transmitter 26 may transmit the above identifier signal to the receiving portion 41 of each of the imaging cartridges 10A to 10D via the respective second signal line. However, an alternative arrangement may also be made. As shown in FIG. 8, the identifier signal transmitter 26 and the respective second signal lines 32 shown in FIG. 2 may be omitted and the identifier signal may be added to the transmission data transmitted from the transmitter 21.

Figure 9:
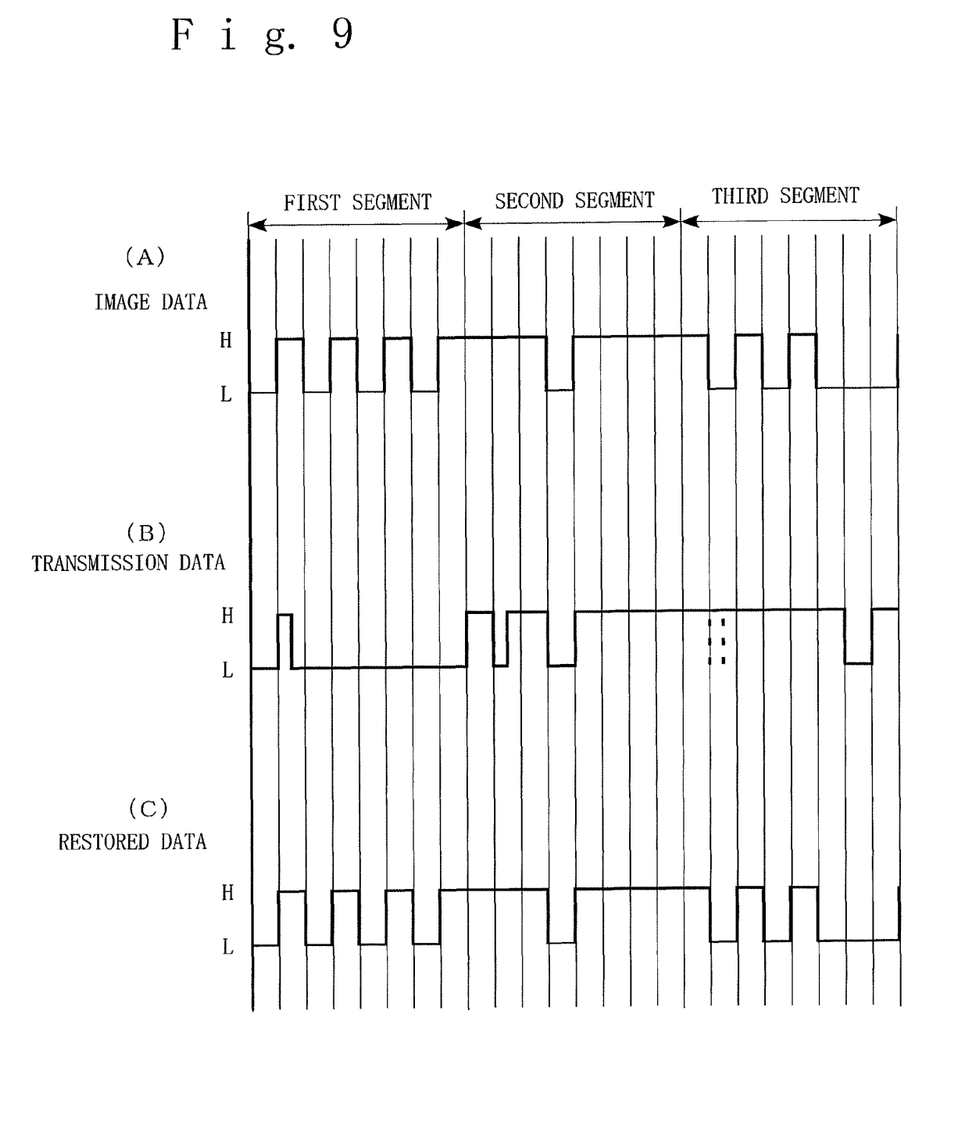
FIG. 9 is a graph illustrating a pulse signal of the image data, a pulse signal of the transmission data converted from the image data and including the identifier signal, a pulse signal of the restored data obtained by converting the transmission data, the signals used in the above modification.

The following method may be used for adding the identifier signal to the transmission data transmitted from the transmitter 21 as described above. As shown in FIG. 9A, for example, when the same image data as that shown in FIG. 3A is converted to the transmission data, the H-identifier signal comprising a nibble may be inserted in the first transmission data segment shown in FIG. 3B at place subsequent to the initial L-signal as shown in FIG. 9B. Further, the L-identifier signal comprising a nibble may be inserted in the second transmission data segment at place subsequent to the initial H-signal. The H-identifier signal comprising a nibble may be inserted in the third transmission data segment at place subsequent to the initial H-signal.

In each of the imaging cartridges 10A to 10D, the converting portion 42 converts only the converted pulse signal in the transmission data to the original pulse signal based on the transmission data having the identifier signal inserted therein and transmitted from the transmitter 21 to the receiving portion 41, as described above. Thus, the converting portion 42 obtains the restored data as shown in FIG. 9C.

More specifically, the first signal segment of the transmission data has the H-identifier signal inserted therein and hence, the converting portion 42 converts the converted pulse signal to the original pulse signal having the levels in the order of L, H, L, H, L, H, L, H, as shown in FIG. 9C. The second signal segment has the L-identifier signal inserted therein so that the pulse signal is not converted. Therefore, the converting portion 42 does not convert the received pulse signal, the levels of which remain in the order of H, H, H, L, H, H, H, H. The third signal segment has the H-identifier signal inserted therein and hence, the converting portion 42 converts the converted pulse signal to the original pulse signal having the levels in the order of H, L, H, L, H, L, L, L.

As a result, the image data comprising the same pulse signal as that of the original image data is correctly reproduced as the restored data in each of the imaging cartridges 10A to 10D.

While the foregoing embodiments illustrate so-called tandem full-color image forming apparatuses employing the plural imaging cartridges 10A to 10D, the application of the invention is not limited to the above image forming apparatuses. The invention is also applicable to, for example, a full-color image forming apparatus adapted to form a full-color image by rotating a rotary-type developing unit retaining plural developing devices for sequentially positioning the respective developing devices at the photosensitive member. The invention is also applicable to an image forming apparatus adapted for monochromatic image formation.

The image forming apparatuses of the embodiments are described by way of the examples where the image signal processor 20 disposed in the apparatus body 1 transmits the data comprising the pulse signal to each of the imaging cartridges 10A to 10D which, in turn, process the received data. However, the aforementioned data processing is not limited to this. The above data processing of the invention may be applied to any case where the data comprising the high-frequency pulse signal, such as the image data, is transmitted via the signal line and is processed. In a copier equipped with a scanner, for example, the above data processing of the invention may be applied to a case where a reading portion of the scanner reads data and transmits the read data to the image processor for data processing.

According to the invention, the data segmenting portion divides the data comprising the pulse signal into the predetermined segments. The fluctuations number counting portion counts the number of pulse-signal fluctuations in the data segment. The determining portion determines whether the count of pulse-signal fluctuations exceeds the predetermined number or not. If it is determined that the number of pulse-signal fluctuations does not exceed the predetermined number, the transmission data controller causes the transmitter to transmit the unchanged data comprising the above pulse signal. On the other hand, if it is determined that the number of pulse-signal fluctuations exceeds the predetermined number, the transmission data controller converts the above pulse signal, the converted pulse signal unchanged at fluctuation of the above pulse signal but fluctuated when the above pulse signal fluctuates. Then, the transmission data controller causes the transmitter to transmit the resultant data. Therefore, the pulse signal transmitted from the transmitter to the receiving portion is reduced in the number of fluctuations so that the occurrence of radiation noises is suppressed.

The invention is constituted such that the converted pulse signal received by the receiving portion is converted to the original pulse signal by means of the converting portion. This permits the receiving portion to reproduce the original data correctly.

As a result, a variety of operations such as image formation may be performed properly. Therefore, the proper density control based on the image binarization method such as dither method may be provided in a case where the data comprising the above pulse signal is the image data. Furthermore, the formed image does not suffer feathering at the edge thereof. Thus is ensured the favorable image formation.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

The invention claimed is:

1. An image forming apparatus comprising:
   a transmitter for transmitting data comprising a pulse signal;
   a receiving portion for receiving the data comprising the pulse signal and transmitted from the transmitter;
   a data segmenting portion for segmenting the data comprising the pulse signal into predetermined segments;
   a fluctuations number counting portion for counting the number of pulse-signal fluctuations in the data segment segmented by the data segmenting portion;
   a determining portion for determining whether the number of pulse-signal fluctuations in the data segment counted by the fluctuations number counting portion exceeds a predetermined number or not;
   a transmission data controller which causes the transmitter to transmit the data comprising the pulse signal in an unchanged manner when the determining portion determines that the number of pulse-signal fluctuations in the data segment does not exceed the predetermined number, and when the determining portion determines that the number of pulse-signal fluctuations in the data segment exceeds the predetermined number, the transmission data controller converts the pulse signal and causes the transmitter to transmit the data with the converted pulse signal, the converted pulse signal is unchanged when the pulse signal fluctuates and is fluctuated when the pulse signal does not fluctuate; and a converting portion for converting the converted pulse signal received by the receiving portion to the original pulse signal.

2. An image forming apparatus according to claim 1, wherein an identifier signal for discriminating the data transmitted from the transmitter between the data comprising the unconverted pulse signal and the data comprising the converted pulse signal is transmitted to the receiving portion on a per-data-segment basis.

3. An image forming apparatus according to claim 2, further comprising an identifier signal transmitter for transmitting the identifier signal to the receiving portion.

4. An image forming apparatus according to claim 3, wherein the identifier signal transmitter transmits the identifier signal to the receiving portion via a signal line other than a signal line through which the data comprising the pulse signal is transmitted from the transmitter to the receiving portion.

5. An image forming apparatus according to claim 2, wherein the identifier signal is transmitted to the receiving portion as added to the data transmitted from the transmitter.

6. An image forming apparatus according to claim 1, wherein the data comprising the pulse signal is image data.

7. A data communication method for transmission/reception of data comprising a pulse signal comprising the steps of:

segmenting the data comprising the pulse signal into predetermined segments;

counting the number of pulse-signal fluctuations in the data segment;

determining whether the count of pulse-signal fluctuations in the data segment exceeds a predetermined number or not;

transmitting the data comprising the pulse signal in an unchanged manner when it is determined that the number of pulse-signal fluctuations in the data segment does not exceed the predetermined number;

converting the pulse signal and transmitting the converted pulse signal in a case when it is determined that the number of pulse-signal fluctuations in the data segment exceeds the predetermined number, the converted pulse signal is unchanged when the pulse signal fluctuates and is fluctuated when the pulse signal does not fluctuate; and receiving the converted pulse signal transmitted to a receiving portion and converting the converted pulse signal to the original pulse signal.

8. A data communication method according to claim 7, further comprising a step of transmitting an identifier signal on a per-data-segment basis, the identifier signal discriminating the transmitted data between the data comprising the unconverted pulse signal and the data comprising the converted pulse signal.

9. A data communication method according to claim 8, wherein the identifier signal is transmitted via a signal line other than a signal line through which the pulse signal or the converted pulse signal is transmitted.

10. A data communication method according to claim 8, wherein the identifier signal is transmitted as added to the pulse signal or the converted pulse signal.

11. A data communication method according to claim 7, wherein the data comprising the pulse signal is image data.

* * * * *